June 23, 1953     R. C. DAVIS     2,642,652
METHOD OF MAKING A WELDED T-JOINT
Filed Jan. 30, 1951
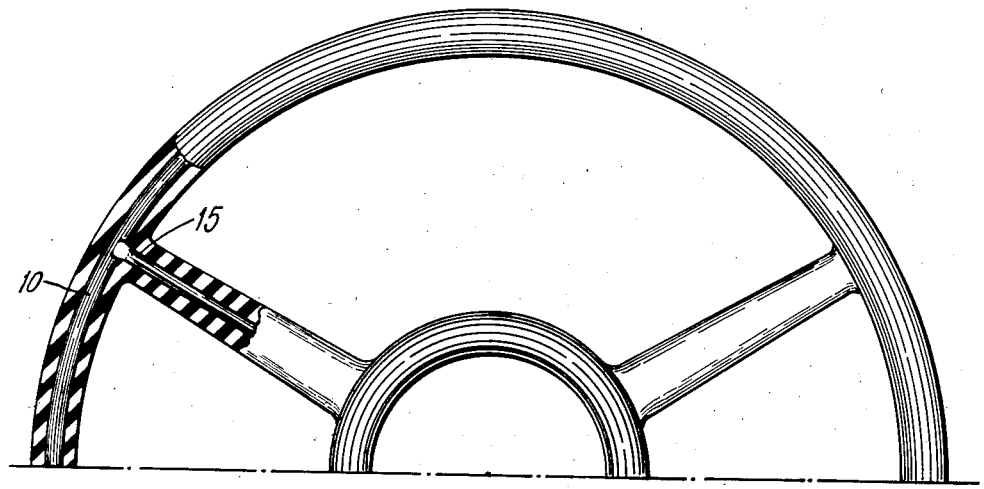
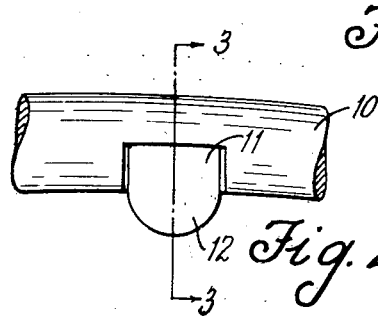
Fig. 1
Fig. 2
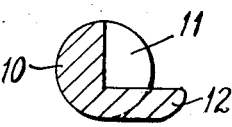
Fig. 3
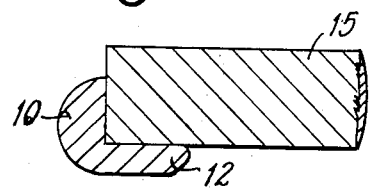
Fig. 4
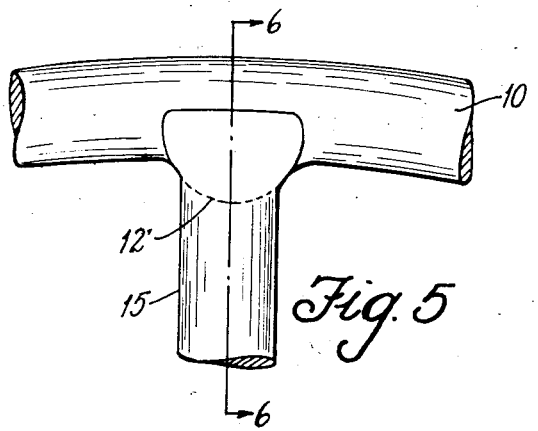
Fig. 5
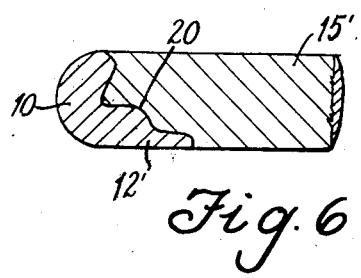
Fig. 6
INVENTOR.
RAYMOND C. DAVIS
BY
Willits Hardman & Jehn
HIS ATTORNEYS Patented June 23, 1953

2,642,652

UNITED STATES PATENT OFFICE 2,642,652

METHOD OF MAKING A WELDED T-JOINT

Raymond C. Davis, Dayton, Ohio, assignor to General Motors Corporation, Detroit, Mich., a corporation of Delaware Application January 30, 1951, Serial No. 208,643

3 Claims. (Cl. 29—148)

This invention relates to a method of making an electrically welded T-joint between two solid metal rods.

An object of the invention is to provide such a joint having increased strength due to the method of first coining a notch in one of the rods to be welded and causing the metal displaced by the coining operation to form a substantial overlapping integral splice subsequently integrated by electric welding with the end portion of the second rod.

Another object is to provide such a joint in a simple speedy and highly efficient manner by the simple operations of coining and electric welding.

Further objects and advantages of the present invention will be apparent from the following description, reference being had to the accompanying drawings wherein a preferred embodiment of the present invention is clearly shown.

In the drawings:

Fig. 1 shows half of a molded automobile steering wheel partially broken away to show the reinforcing rim ring and one of the metal spokes welded together according to this invention.

Fig. 2 shows in an enlarged scale a portion of the metal rim ring having a notch coined therein to initially receive the end of the metal spoke.

Fig. 3 is a section on line 3—3 of Fig. 2.

Fig. 4 shows the end of the metal spoke inserted into the coined notch in the rim ring prior to the welding operation.

Fig. 5 is a plan view on an enlarged scale of the final welded T-joint between the rim ring and spoke end.

Fig. 6 is a section on line 6—6 of Fig. 5 and indicates the final relatively large welded area between the spoke end and rim ring.

Similar reference characters refer to similar parts throughout the several views.

The method of this invention is especially suitable for use in making steel reinforcing skeletons for molded automotive steering wheels, wherein the steel rim ring and steel spoke members should be very strongly joined together for safety sake in order to avoid failure of these joints under the impact of the driver's body in the event of a collision, or at any other time. Ordinary welded butt joints between rim ring and spoke ends are subject to failure unless great care is exercised in fitting same neatly together prior to welding and thereafter in the welding operation, because at best the welded area at the joint is limited roughly to the cross sectional area of the metal spoke. In order to get a reasonably neat fit between the spoke end and rim ring prior to welding, in some cases the rim ring has been cut away to form a flattened surface thereon, or otherwise cut away to provide a notch therein to receive the spoke end. In all such cases where the rim ring is cut away its strength at that particular point is necessarily reduced by its loss of cross section, hence unless such loss of cross section is very carefully made up at the welding operation by additional metal from the spoke end the final joint will remain weaker than the rest of the rim ring even assuming that a perfect weld be had over the full cross section area of the spoke end.

Now according to this invention notches are formed in the rim ring by a coining operation by which the metal displaced from the notch remains adjacent to the notch and so aids in buttressing up the final welded joint. As shown in Figs. 2 and 3, the round section rim ring 10 has a notch 11 coined therein only on the inside half of the cross section thereof in such manner that the displaced metal is projected radially inward to form an integral projection or lug 12 of substantial thickness and strength, all without actually losing any of the metal of the rim ring. The metal spoke end 15 is then set within notch 11 to overlie and rest upon the integral lug 12 as shown in Fig. 4. It is not necessary that the spoke end 15 fit so neatly within notch 11 as is illustrated in Fig. 4. An initially loose fit at this point is sufficient since any unfilled cracks or other normal voids between the surfaces of notch 11 and spoke end 15 will be completely filled by fused metal when spoke end 15 is pressed downwardly against lug 12 while these parts are being electrically welded together.

In Fig. 4 the upper surface of spoke end 15 lies offset a substantial distance above the upper surface of rim ring 10. Therefore when the welding electrodes are applied above and below the assembly of Fig. 4 and pressed together during the welding operation, this pressure will cause the metal of lug 12 and of spoke end 15 to mutually embed and fuse into each other until the upper surface of spoke end 15 lies flush with the upper surface of rim ring 10.

Fig. 6 shows in a general way the final contour line 20 at the center line of the welded surfaces, and illustrates how the lug 12 of Fig. 4 is partially fused and changed to the shape of lug 12′ in Fig. 6 while it is being embedded in spoke end 15. Thus the lug 12 serves to greatly increase the area of the final welded surfaces and hence the strength of the welded joint between rim ring 10 and spoke end 15 in a very simple manner.

When making steel skeletons to be used as molding inserts for steering wheels, the metal spokes 15 may first be fixed to the metal hub to form a metal spider. The rim ring 10 is formed from a round rod as a continuous ring with its ends suitably welded together in a manner well known. The several properly spaced notches 11 for the spoke ends 15 may then be coined in ring 10 on its radially inner half cross-section, preferably all at one coining operation. The metal spider is then simply set upon the rim ring 10 or vice versa, as arranged in a suitable welding fixture, so that the several spoke ends 15 are received in the notches 11 respectively as above described, with no special care being required to obtain a snug fit within said notches due to the presence of lugs 12. Then the several spoke ends 15 are electrically welded to ring 10 (preferably all at one time) while suitable pressure is applied to force spoke ends 15 into flush relationship with ring 10, as above described.

While the embodiment of the present invention as herein disclosed, constitutes a preferred form, it is to be understood that other forms might be adopted.

What is claimed is as follows:

1. The steps in the method of making a welded T-joint between two solid metal rods, comprising; coining a notch in only one-half of the cross section of one of the rods, simultaneously causing the displaced metal from the notch to flow outwardly for forming a laterally extending integral lip projection thereon, inserting the end portion of the second rod into assembled relation with said notch and in contact with and overlying said laterally extending lip projection, the vertical dimension of the end portion of the second rod being greater than the depth of the said coined notch so that the end portion projects above the upper surface of said notched rod, and then electrically welding said rods at the notched portion and simultaneously causing the assembled portion of said rods to be deformed for integrating said laterally extending projection with the metal of said end portion and for forming a substantially flush strong joint between the rods.

2. The steps in the method of making a welded T-joint between two solid metal rods of approximately the same diameter, comprising; notching one rod through approximately one-half the cross section thereof and simultaneously displacing metal from the notch to form a laterally extending integral lip projection at the notched portion thereof, the depth of said notch being from one-third to two-thirds of the rod diameter, assembling the end portion of a second rod in said notch in contact with and overlying said integral lip projection, then electrically welding said rods together at the notched portion and simultaneously deforming the assembled portion only of said rods for embedding and fusing together substantial portions of each rod into the other for forming a substantially flush strong T-joint.

3. The steps in the method of making a welded steering wheel frame including a steel rim portion and a steel spoke portion attached thereto, comprising; notching the rim at the inner periphery thereof and at the upper side only by coining a recess in said rim and simultaneously flowing the coined metal outwardly of the notch to form an integral inwardly extending lip, inserting a spoke end into said notch so as to overlie said lip, said spoke end being of a diameter greater than the notch depth and then deforming said lip and spoke into a smooth flush joint by applying pressure simultaneously with welding current.

RAYMOND C. DAVIS.

References Cited in the file of this patent

UNITED STATES PATENTS

| Number | Name | Date |
|---|---|---|
| 2,306,202 | Young | Dec. 22, 1942 |
| 2,338,197 | Nelson | Jan. 4, 1944 |